United States Patent
Nanko

(10) Patent No.: US 6,902,503 B2
(45) Date of Patent: Jun. 7, 2005

(54) BICYCLE DERAILLEUR

(75) Inventor: Yoshiaki Nanko, Osaka (JP)

(73) Assignee: Shimano Inc., Osaka (JP)

( * ) Notice: Subject to any disclaimer, the term of this patent is extended or adjusted under 35 U.S.C. 154(b) by 133 days.

(21) Appl. No.: 10/374,525

(22) Filed: Feb. 27, 2003

(65) Prior Publication Data

US 2004/0171446 A1 Sep. 2, 2004

(51) Int. Cl.[7] .................. F16H 63/04; F16B 39/34; F16C 1/10
(52) U.S. Cl. .................. 474/80; 474/79; 74/502.4; 74/502.6; 411/302; 411/369
(58) Field of Search .............. 474/80–82; 411/369–370, 411/533–542, 302; 285/220, 212; 74/502.6, 50, 502.4

(56) References Cited

U.S. PATENT DOCUMENTS

| | | | | |
|---|---|---|---|---|
| 2,752,814 A | * | 7/1956 | Iaia | 411/542 |
| 4,066,058 A | * | 1/1978 | Anderkay | 123/198 E |
| 4,701,088 A | * | 10/1987 | Crull | 411/369 |
| 4,702,657 A | * | 10/1987 | Jelinek | 411/369 |
| 5,188,495 A | * | 2/1993 | Jones, Jr. | 411/369 |
| 5,647,710 A | * | 7/1997 | Cushman | 411/397 |
| 5,779,581 A | * | 7/1998 | Fujii | 474/82 |
| 6,234,926 B1 | * | 5/2001 | Soon et al. | 474/80 |
| 6,470,767 B2 | * | 10/2002 | Takachi | 74/502.6 |

FOREIGN PATENT DOCUMENTS

| | | | | |
|---|---|---|---|---|
| JP | 11-37132 A | * | 2/1999 | F16B/43/00 |
| JP | 2000-355296 A | * | 12/2000 | B62M/39/22 |

OTHER PUBLICATIONS

Sixteen (16) photos of bicycle and fishing rod parts; photos taken on or before Feb. 6, 2003 in Japan.

* cited by examiner

Primary Examiner—Marcus Charles
(74) Attorney, Agent, or Firm—Shinjyu Global IP Counselors, LLP

(57) ABSTRACT

A bicycle front derailleur has a fixed member, a movable member, linkage assembly and cable attachment assembly. The cable attachment assembly has a cable fixing bolt, cable fixing washer and a first resilient member. The first resilient member is arranged to retain the cable fixing washer on the shaft portion of the cable fixing bolt is located. The fixed member includes a derailleur fixing bolt, a derailleur fixing washer, and a second resilient member. The second resilient member is arranged to retain the derailleur fixing washer on the shaft portion of the derailleur fixing bolt.

24 Claims, 7 Drawing Sheets

BICYCLE DERAILLEUR

BACKGROUND OF THE INVENTION

1. Field of the Invention

This invention generally relates to a bicycle derailleur. More specifically, the present invention relates to a bicycle derailleur with a fixing bolt that has a washer retained thereon. The fixing bolt is either a cable fixing bolt or a derailleur fixing bolt.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the shifting components of the bicycle. One part of the bicycle that has been extensively redesigned is the front derailleur. A front derailleur is typically mounted onto the bicycle frame adjacent to the front sprockets.

Generally, a front derailleur includes a fixed or base member non-movably secured to a bicycle frame, and a movable member supported to be movable relative to the fixed member. Typically, the fixed member is a tubular clamping member that is secured to the seat tube. Alternatively, the fixed member is sometimes coupled to the bottom bracket. The movable member typically has a chain guide with a pair of cage plates for contacting and moving a chain between the front sprockets. The movable member is usually biased in a given direction relative to the fixed member by a spring. The movable member is usually moved relative to the fixed member by pulling and/or releasing a shift control cable that is coupled to the front derailleur. The movable member and the fixed member usually are interconnected through pivotal links. The control cable is connected to one of the pivotal links to apply a torque thereto, thereby causing the links to move the movable section. The control cable is fixed to the link in such a position that an operating force applied to the control cable. This force on the cable is converted into a link swinging torque.

Typically, the control cable of the front derailleur is attached to one of the links by a cable fixing bolt that has a cable fixing washer. During attachment of the control cable to the front derailleur, the cable fixing washer can fall off. This can result in lost time in attaching the control cable to the front derailleur.

Moreover, the front derailleur is often attached to a bracket by a derailleur fixing bolt that has a fixing washer. During attachment of the front derailleur to the bracket, the fixing washer can fall off. This can result in lost time in attaching the front derailleur to the bracket of the bicycle.

In view of the above, it will be apparent to those skilled in the art from this disclosure that there exists a need for an improved bicycle front derailleur that overcomes the above mentioned problems in the prior art. This invention addresses this need in the art as well as other needs, which will become apparent to those skilled in the art from this disclosure.

SUMMARY OF THE INVENTION

One object of the present invention is to provide a front bicycle derailleur in which a fixing washer is retained on the fixing bolt for easy installation.

Yet another object of the present invention is to provide a front bicycle derailleur that is relatively simple and inexpensive to manufacture and/or assemble.

The foregoing objects can basically be attained by providing a bicycle front derailleur comprising a fixed member, a movable member, linkage assembly and cable attachment assembly. The fixed member is configured to be coupled to a bicycle frame. The movable member has a chain guide portion with a chain receiving slot configured to shift a chain of the bicycle in a transverse direction. The linkage assembly is coupled between the fixed member and the chain guide portion to move the chain guide portion between a retracted position and an extended position. The cable attachment assembly coupled to the linkage assembly, the cable attachment assembly including a cable fixing bolt, cable fixing washer and a resilient member. The cable fixing bolt has a head portion with a tool engaging surface and a shaft portion with threads that are received in a threaded hole of the linkage assembly. The cable fixing washer includes an outer peripheral surface and an inner peripheral surface defining a bolt receiving opening in which the shaft portion of the cable fixing bolt is located. The resilient member is retained on the shaft portion between the threads and the head portion. The resilient member is arranged to retain the cable fixing washer on the shaft portion of the cable fixing bolt is located.

The foregoing objects can also basically be attained by providing a bicycle front derailleur comprising a fixed member, a movable member, a linkage assembly and a cable attachment assembly. The fixed member is configured to be coupled to a bicycle frame. The movable member has a chain guide portion with a chain receiving slot configured to shift a chain of the bicycle in a transverse direction. The linkage assembly is coupled between the fixed member and the chain guide portion to move the chain guide portion between a retracted position and an extended position. The cable attachment assembly is coupled to the linkage assembly. The fixed member includes a derailleur fixing bolt, a derailleur fixing washer, and a resilient member. The derailleur fixing bolt has a head portion with a tool engaging surface and a shaft portion with threads that are received in a threaded hole formed the fixed member. The derailleur fixing washer includes an outer peripheral surface and an inner peripheral surface defining a bolt receiving opening in which the shaft portion of the derailleur fixing bolt is located. The resilient member is retained on the shaft portion between the threads and the head portion. The resilient member is arranged to retain the derailleur fixing washer on the shaft portion of the derailleur fixing bolt.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
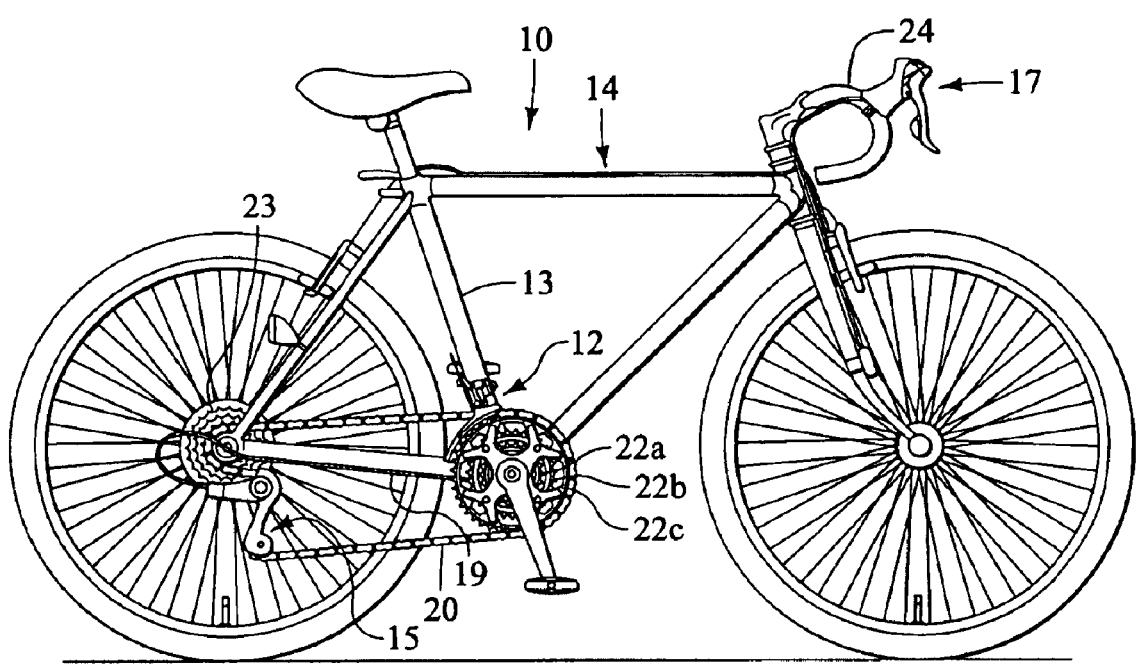
FIG. 1 is a side elevational view of a bicycle with a front bicycle derailleur with a cable fixing bolt assembly and a derailleur fixing bolt assembly in accordance with the present invention.
Figure 2:
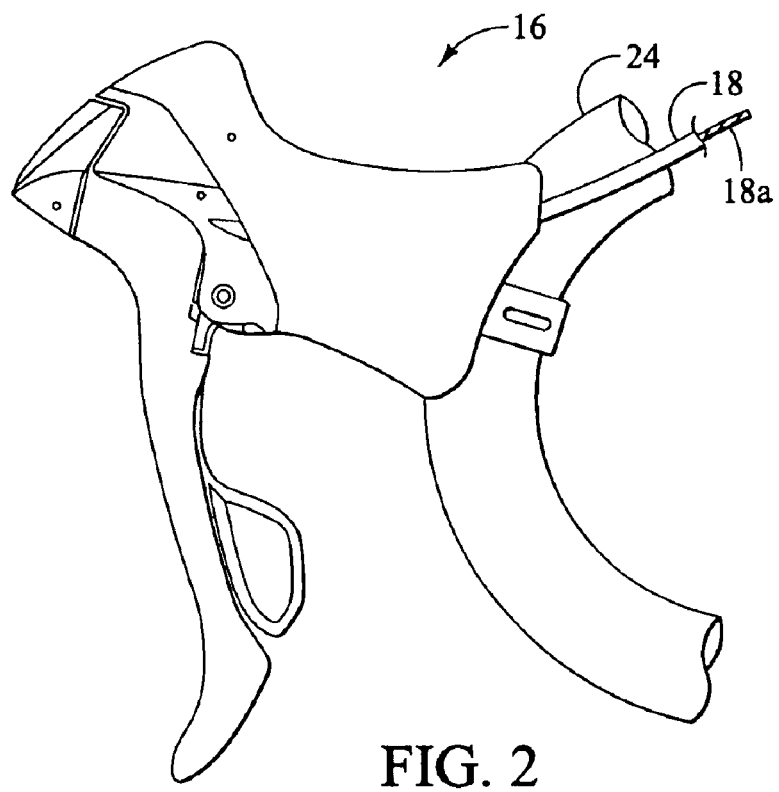
FIG. 2 is a side elevational view of a front shifter or shift operating device that operates the front derailleur illustrated in FIG. 1.

Referring initially to FIG. 1, a bicycle 10 with a front derailleur 12 is illustrated in accordance with a first embodiment of the present invention. The front derailleur 12 is fixedly coupled to a seat tube 13 of a bicycle frame 14. The bicycle 10 also has a rear derailleur 15, which can be constructed in accordance with the present invention. The front derailleur 12 and the rear derailleur 15 are operated in a conventional manner by a pair of shifting units 16 and 17, respectively, that are mounted on the handlebar 24. The shifting unit 17 for the rear derailleur 15 is shown in FIG. 1, while the shifting unit 16 for the front derailleur 12 is shown in FIG. 2. The front derailleur 12 operates (pulls or releases) a shift control or derailleur cable 18, which moves the front derailleur 12 to shift a chain 20 between three front sprockets 22a, 22b and 22c of the drive train. The rear derailleur 15 operates (pulls or releases) a shift control or derailleur cable 19, which moves the rear derailleur 15 to shift the chain 20 between a plurality of rear sprockets 23 of the drive train.

While the front derailleur 12 is illustrated as a three-stage or three position derailleur shifting the chain 20 between the three front sprockets 22a, 22b and 22c of the drive train, it will be apparent to those skilled in the art from this disclosure that the front derailleur 12 can be used in a drive train with only two front sprockets as needed and/or desired.

Bicycles and their various components are well known in the art, and thus, bicycle 10 and its various components will not be discussed and/or illustrated in detail herein, except for the components that relate to the present invention. In other words, only the front derailleur 12 and the components that relate thereto will be discussed and/or illustrated in detail herein. As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Figure 3:
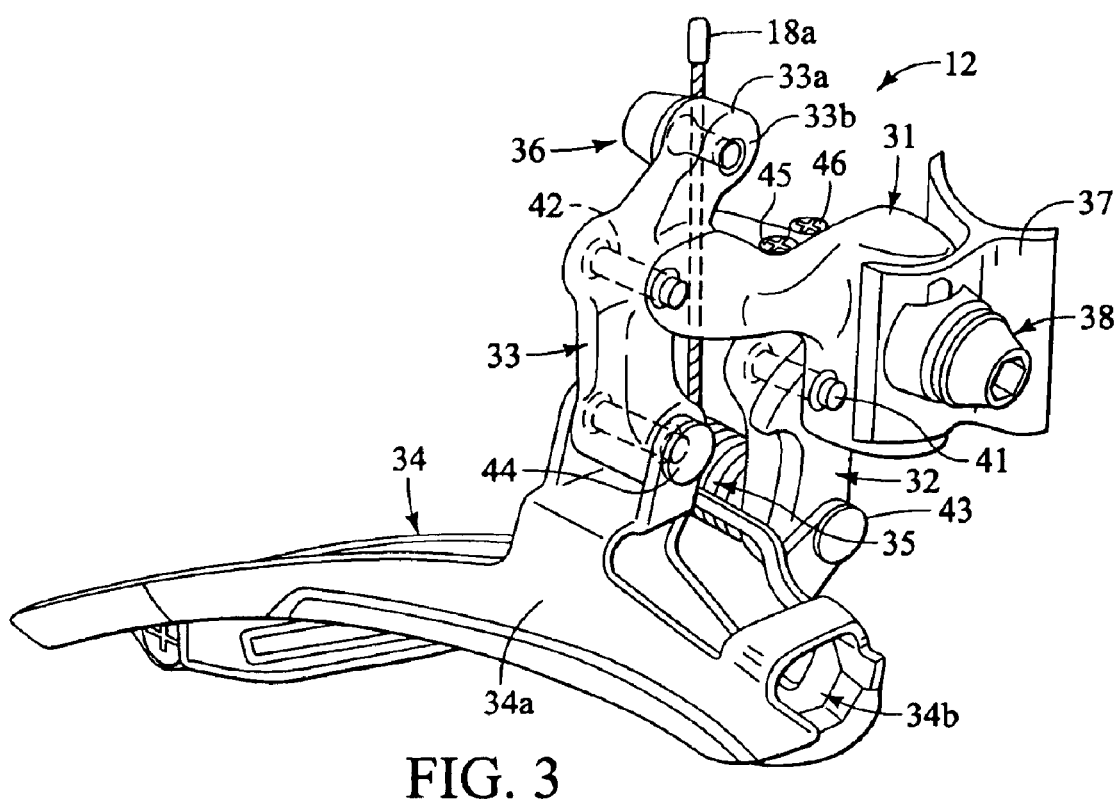
FIG. 3 is a front side perspective view of the front derailleur in FIG. 1, with the chain guide in an extended shift position.
Figure 4:
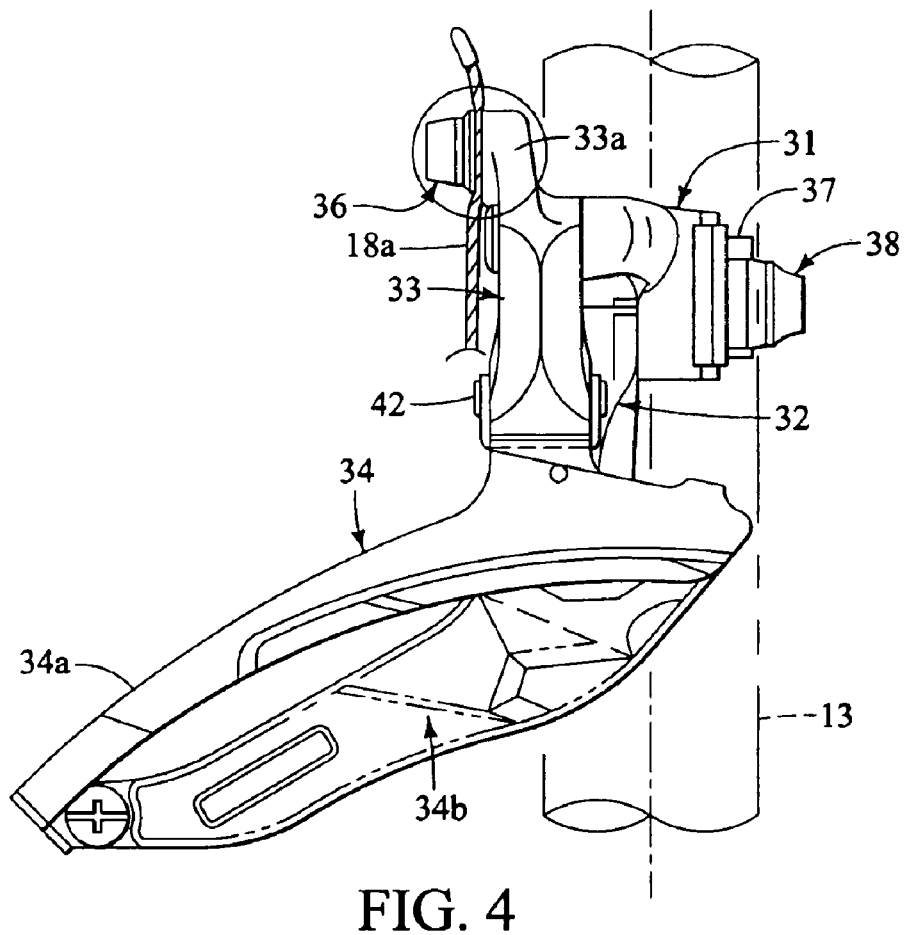
FIG. 4 is an outside elevational view of the front derailleur in FIG. 3, with the chain guide in an retracted shift position.
Figure 5:
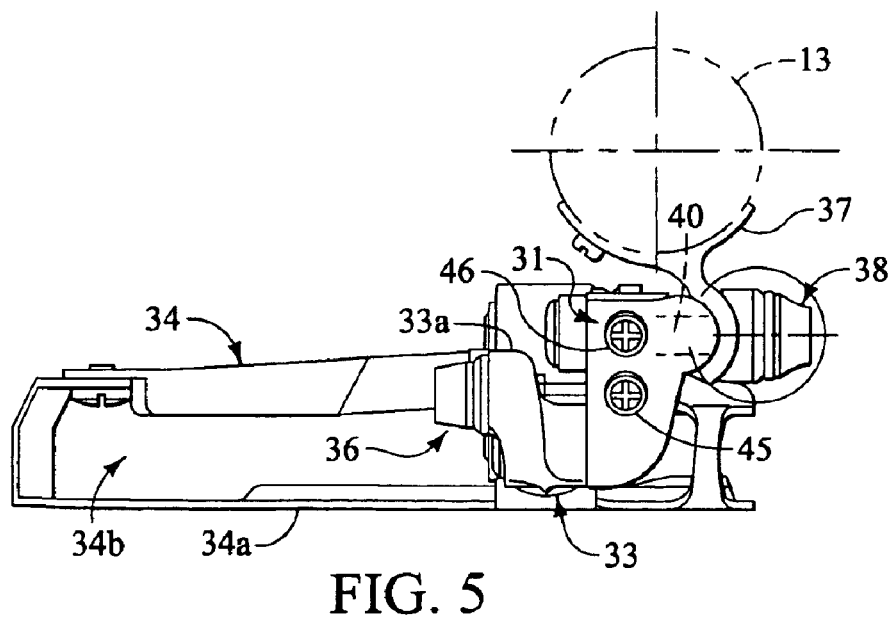
FIG. 5 is a top plan view of the front derailleur of the bicycle illustrated in FIGS. 3 and 4, with the chain guide in the retracted shift position.

Referring now to FIGS. 3–5, the front derailleur 12 of the present invention will now be discussed in more detail. The front derailleur 12 basically includes a base or fixed member 31, an inner link member 32, an outer link member 33, a movable member 34 and a biasing member 35. An inner wire 18a of the derailleur cable 18 is fixedly coupled to the outer link member 33 by a cable attachment assembly 36. The fixed member 31 is fixedly coupled to the seat tube 13 of the bicycle frame 14 via a clamping bracket 37 and a derailleur fixing bolt assembly 38. The members 31–34 form a four-bar linkage assembly that moves the movable member 34 laterally towards and away from the fixed member 31.

In the illustrated embodiment, the front derailleur 12 is a bottom swing type front derailleur. Thus, the movable member 34 moves laterally outward and upwardly relative to a center longitudinal plane of the bicycle frame 14 when the control cable 18 is pulled by the shifting unit 16. Accordingly, the movable member 34 moves laterally towards/away from the seat tube 13 of the bicycle frame 14 to shift the chain 20 laterally between the front sprockets 22a, 22b and 22c by operating the shifting unit 16, which releases/pulls the shift control cable 18. In other words, the inner and outer links 33 and 34 swing below the upper pivot axes to form a four bar linkage assembly together with the fixed member 31 and the movable member 34 of the front derailleur 12 in a relatively conventional manner.

As best seen in FIG. 5, the fixed member 31 is configured to be coupled to the bicycle frame 14 by the clamping bracket 37 and the derailleur fixing bolt assembly 38 as discussed below. Basically, the fixed member 31 includes a frame fixing hole 40 for mounting the clamping bracket 37 thereto by the derailleur fixing bolt assembly 38. As best seen in FIG. 3, the inner and outer link members 32 and 33 are pivotally coupled to the fixed member 31 by pivot pins 41 and 42.

The inner link member 32 has one end pivotally coupled to the fixed member 31 by the pivot pin 41 and the other end pivotally coupled to the movable member 34 by a pivot pin 43. The outer link member 33 has one end pivotally coupled to the fixed member 31 by the pivot pin 42 and the other end pivotally coupled to the movable member 34 by a pivot pin 44. The outer link member 33 has an extension portion 33a with a threaded hole 33b for coupling the inner wire 18b thereto by the cable attachment assembly 36.

The main body of the fixed member 31 includes a pair of threaded adjustment holes with a pair of vertical adjustment screws 45 and 46 threadedly coupled therein, respectively. The adjustment screws 45 and 46 can be rotated to adjust their vertical positions such that their free ends selectively contact the inner link member 32 to control the range of movement of the inner link member 32, and thus, control the range of movement of the movable member 34.

The movable member 34 has a chain guide portion 34a with a chain receiving slot 34b configured to shift the chain 20 of the bicycle 10 in a transverse direction relative to the longitudinal plane of the bicycle frame 14. The movable member 34 has a chain guide portion 34a with chain guide surfaces configured to laterally move the chain 20. The inner and outer link members 32 and 34 are also pivotally coupled to the movable member 34 at their lower ends to pivot relative to the movable member 34 about lower pivot axes, respectively. The inner and outer link members 32 and 33 are also pivotally coupled to the fixed member 31 at their upper ends to pivot relative to the fixed member 31 about upper pivot axes, respectively. Thus, the inner and outer link members 32 and 33 form a part of the linkage assembly that is operatively coupled between the fixed member 31 and the chain guide portion 34a to move the chain guide portion 34a between a retracted position and an extended position.

The biasing member 35 is preferably a torsion spring with its coiled portion disposed on the pivot pin 43 and its first and second free ends operatively engaging the inner link member 32 and the movable member 34, respectively. More specifically, the biasing member 35 is coupled between the inner link member 32 and the movable member 34 to apply an urging force that normally biases the movable member 34 toward the seat tube 13 of the bicycle frame 14.

Figure 6:
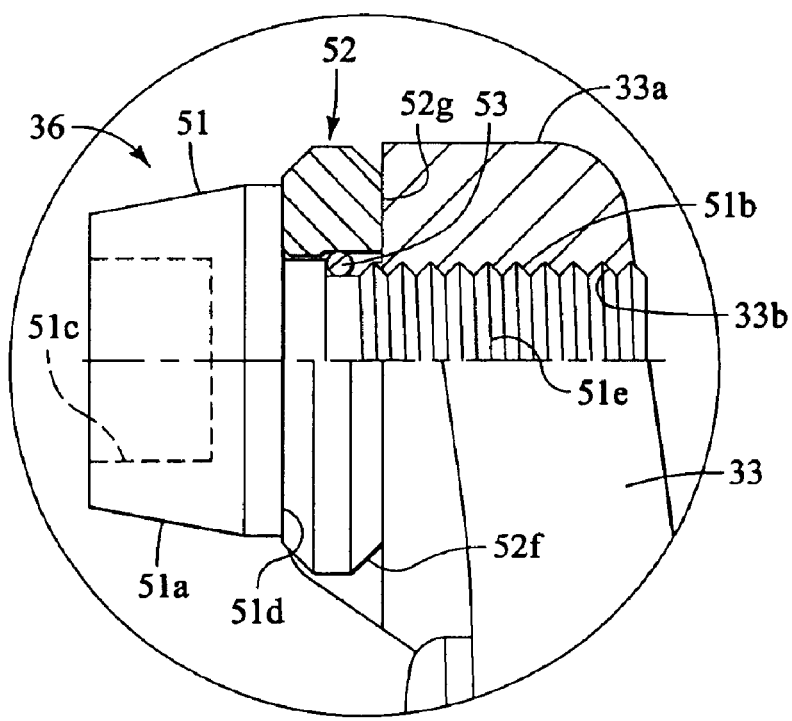
FIG. 6 is an enlarged partial side elevational view of the extension or cable fixing portion with the cable fixing bolt assembly coupled thereto with the cable fixing washer and the resilient retaining member shown in partial cross section.
Figure 7:
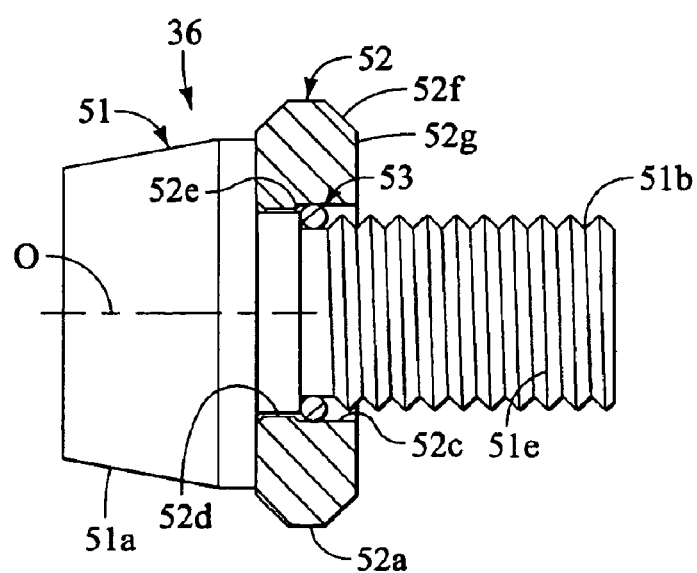
FIG. 7 is an enlarged side elevational view of the cable fixing bolt assembly with the cable fixing washer and the resilient retaining member shown in partial cross section.
Figure 8:
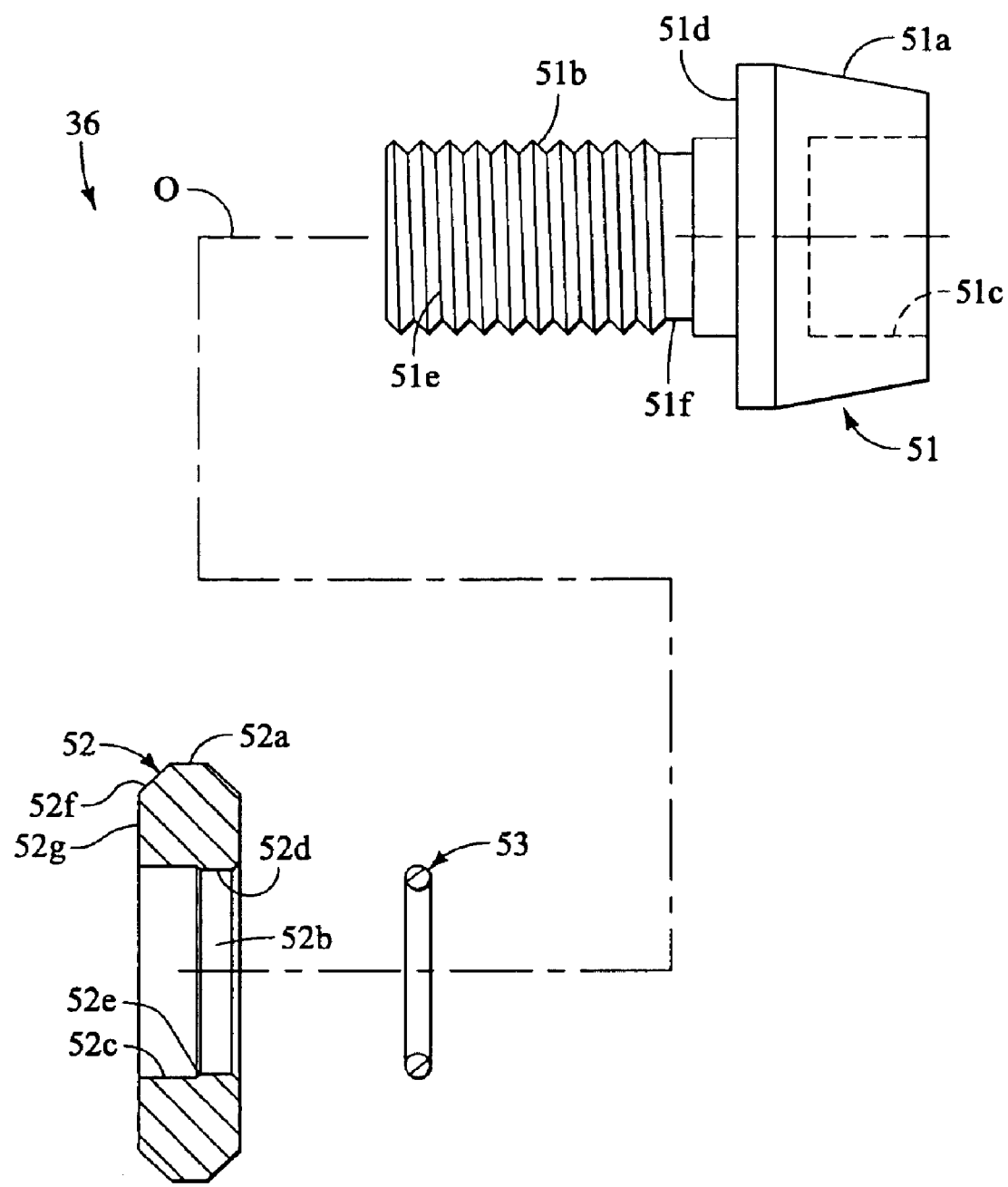
FIG. 8 is an enlarged exploded side elevational view of the cable fixing bolt assembly with the cable fixing washer and the resilient retaining member shown in cross section.

As best seen in FIGS. 3 and 4, the cable attachment assembly 36 is coupled to the linkage assembly, i.e., the extension portion 33a of the outer link member 33. Referring now to FIGS. 6–8, the cable attachment assembly 36 includes a cable fixing bolt 51, a cable fixing washer 52, and a resilient member 53. The resilient member 53 retains the cable fixing washer 52 on the cable fixing bolt 51 as discussed below.

As best seen in FIGS. 6–8, the cable fixing bolt 51 is a hard, rigid member that includes a head portion 51a and a shaft portion 51b. The head portion 51a and the shaft portion 51b are preferably integrally formed as a one-piece, unitary member from a suitable hard, rigid material. The head portion 51a includes a tool engaging surface 51c at one end and an axial abutment surface 51d at the other end facing towards the shaft portion 51b. The tool engaging surface 51c of the head portion 51a is an axially extending blind bore with a non-circular transverse cross section, preferably a hexagonal cross section.

The shaft portion 51b includes a first end with the head portion 51a fixedly coupled thereto and a second end with the threads 51e formed thereon. A center axis 0 extends longitudinally between the first and second ends of the shaft portion 51b. The shaft portion 51b has threads 51e that are received in the threaded hole 33b of the extension portion 33a of the outer link member 33.

The resilient member 53 is retained on the shaft portion 51b between the threads 51e and the head portion 51a. In particular, an annular groove 51f is formed in the first end of the shaft portion 51b adjacent the head portion 51a. The resilient member 53 is disposed in the groove 51f to releasably retain the cable fixing washer 52 on the shaft portion 51b.

The cable fixing washer 52 is disposed on the shaft portion 51b between the threads 51e and the head portion 51a. The cable fixing washer 52 includes an annular outer peripheral surface 52a and an annular inner peripheral surface 52b defining bolt receiving opening in which the shaft portion 51b of the cable fixing bolt 51 is located. The inner peripheral surface 52b of the cable fixing washer 52 has an annular step shape that forms an annular recess 52c in which the resilient member 53 is disposed. In other words, the inner peripheral surface 52b of the cable fixing washer 52 has a first annular section defined by the annular recess 52c with a first predetermined width and a second annular section defined by an annular flange 52d with a second predetermined width that is smaller than the first predetermined width of the first annular section defined by the annular recess 52c to form an axially facing abutment surface 52e. The outer peripheral surface 52b has a tapered section 52f that extends from an axially facing end surface 52g in a radially outward direction. This tapered section 52f reduces stress in the wire 18a.

Preferably, the resilient member 53 is a flexible O-ring that is constructed of a resilient, flexible material such as an elastomeric material. The inner radial width or diameter of the opening of the resilient member 53 is substantially equal to or slightly smaller than the outer width or diameter of the groove 51f of the shaft portion 51b. The outer radial width or diameter of the resilient member 53 is slightly larger than the inner width or diameter of the annular recess 52c of the cable fixing washer 52. Thus, the resilient member 53 is slightly compressed in the radial direction when the cable fixing washer 52 is installed over the resilient member 53, which is disposed in the annular recess 51f of the shaft portion 51b. In this construction, the cable fixing washer 52 can be easily removed and/or replaced as needed and/or desired without damaging the resilient member 53.

Figure 9:
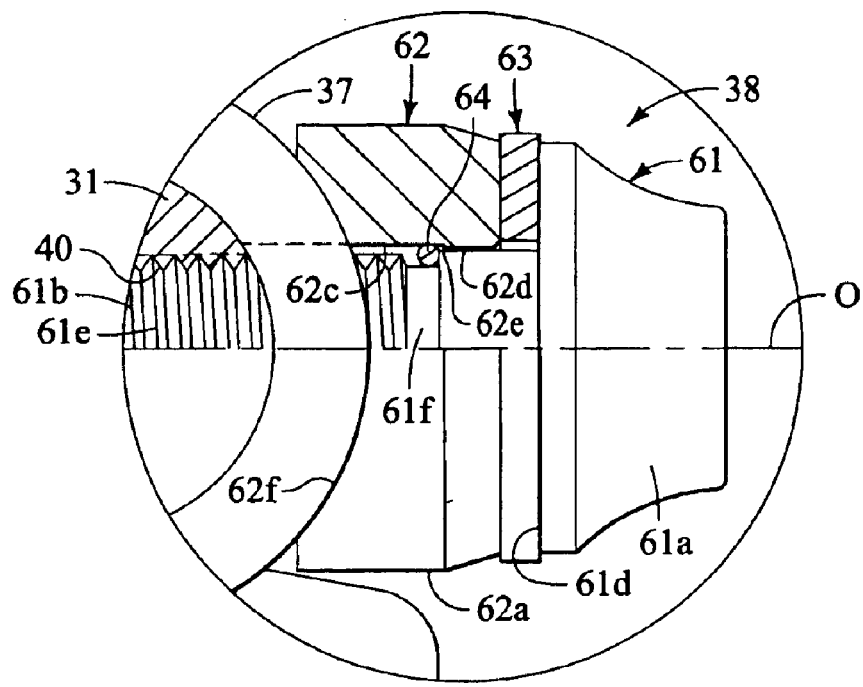
FIG. 9 is an enlarged partial side elevational view of the derailleur fixing bolt assembly coupled to the derailleur fixing portion (the fixed member) of the front derailleur illustrated in FIGS. 3–5, the derailleur fixing washer, the secondary washer and the resilient retaining member shown in partial cross section.
Figure 10:
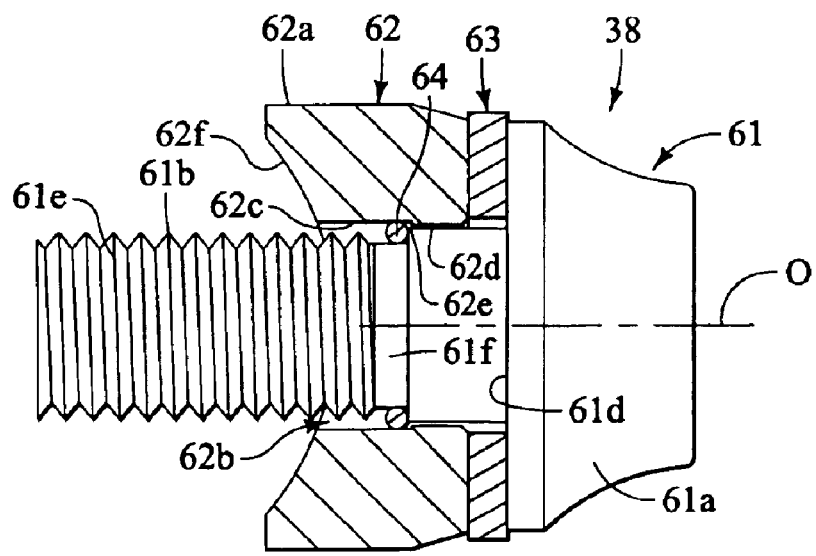
FIG. 10 is an enlarged side elevational view of the derailleur fixing bolt assembly with the derailleur fixing washer, the secondary washer and the resilient retaining member shown in cross section.
Figure 11:
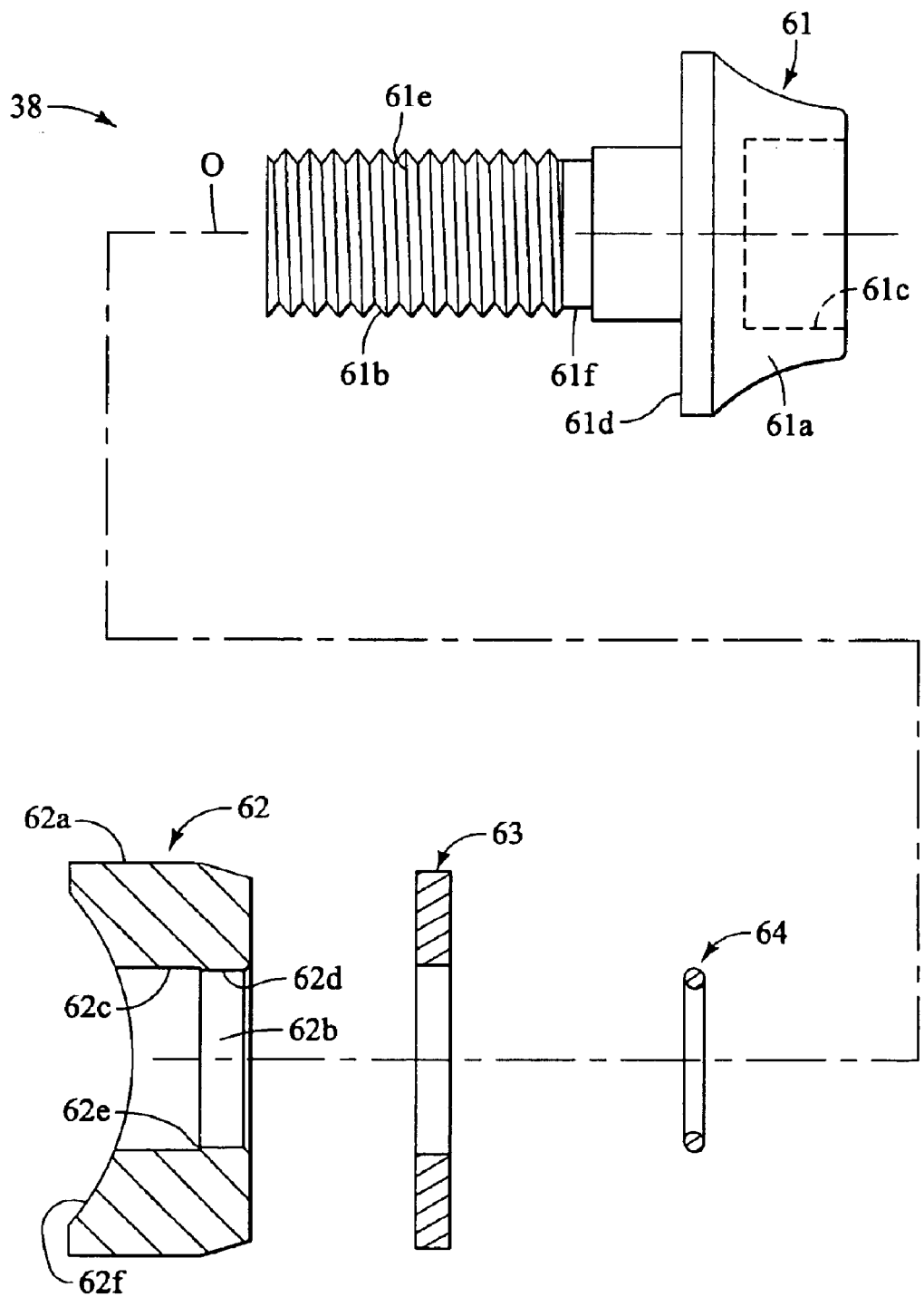
FIG. 11 is an enlarged exploded side elevational view of the derailleur fixing bolt assembly with the derailleur fixing washer, the secondary washer and the resilient retaining member shown in cross section.

Referring now to FIGS. 9–11, the derailleur fixing bolt assembly 38 includes a derailleur fixing bolt 61, a cable fixing washer 62, a secondary washer 63 and a resilient member 64. The resilient member 64 retains the derailleur fixing washer 62 on the derailleur fixing bolt 61.

As best seen in FIG. 11, the derailleur fixing bolt 61 is a hard, rigid member that includes a head portion 61a and a shaft portion 61b. The head portion 61a and the shaft portion 61b are preferably integrally formed as a one-piece, unitary member from a suitable hard, rigid material. The head portion 61a includes a tool engaging surface 61c at one end and an axial abutment surface 61d at the other end facing towards the shaft portion 61b. The tool engaging surface 61c of the head portion 61a is an axially extending blind bore with a non-circular transverse cross section, preferably a hexagonal cross section.

The shaft portion 61b includes a first end with the head portion 61a fixedly coupled thereto and a second end with the threads 61e formed thereon. A center axis 0 extends longitudinally between the first and second ends of the shaft portion 61b. The shaft portion 61b has threads 61e that are received in the threaded hole 40 of the fixed member 31.

The resilient member 64 is retained on the shaft portion 61b between the threads 61e and the head portion 61a. In particular, an annular groove 61f is formed in the first end of the shaft portion 61b adjacent the head portion 61a. The resilient member 64 is disposed in the groove 61f to releasably retain the derailleur fixing washer 62 on the shaft portion 61b.

As seen in FIGS. 9 and 10, the derailleur fixing washer 62 is disposed on an unthreaded section of the shaft portion 61b between the threads 61e and the head portion 61a. The derailleur fixing washer 62 includes an annular outer peripheral surface 62a and an annular inner peripheral surface 62b defining bolt receiving opening in which the shaft portion 61b of the derailleur fixing bolt 61 is located. The inner peripheral surface 62b of the derailleur fixing washer 62 has an annular step shape that forms an annular recess 62c in which the resilient member 64 is disposed. In other words, the inner peripheral surface 62b of the derailleur fixing washer 62 has a first annular section defined by the annular recess 62c with a first predetermined width and a second annular section defined by an annular flange 62d with a second predetermined width that is smaller than the first predetermined width of the first annular section defined by the annular recess 62c to form an axially facing abutment surface 62e. The derailleur fixing washer 62 has a concave end surface 62f facing in an axial direction for contacting the fixed member 31. The concave end surface 62f has a shape that mates with the outer contact surface of the fixed member 31.

Preferably, the resilient member 64 is a flexible O-ring that is constructed of a resilient, flexible material such as an elastomeric material. The inner radial width or diameter of the opening of the resilient member 64 is slightly smaller than the outer width or diameter of the groove 61f of the shaft portion 61b. The outer radial width or diameter of the resilient member 64 is slightly larger than the inner width or diameter of the annular recess 62c of the derailleur fixing washer 62. Thus, the resilient member 64 is slightly compressed in the radial direction when the derailleur fixing washer 62 is installed over the resilient member 64, which is disposed in the annular recess 62c of the shaft portion 61b. In this construction, the derailleur fixing washer 62 can be easily removed and/or replaced as needed and/or desired without damaging the resilient member 64.

Operation of the front derailleur 12 will now be briefly discussed. The front derailleur 12 basically operates in a relatively conventional manner to move the chain guide portion 34a laterally over the three front sprockets 22a, 22b and 22c to shift the chain 20 therebetween. Basically, when the control cable 18 is pulled via the shift control unit 16, the link members 32 and 33 move against the biasing force of the biasing member 35 to shift the chain guide portion 34a laterally away from the center plane of the bicycle 10. Conversely, when the control cable 18 is released via the shift control unit 16, the link members 32 and 33 move due to the biasing force of the biasing member 35 in an opposite direction to shift the chain guide portion 34a laterally toward the center plane of the bicycle 10. In other words, the movable member 34 is normally biased toward the inner position from the middle and outer positions relative to the center plane.

The terms of degree such as "substantially", "about" and "approximately" as used herein mean a reasonable amount of deviation of the modified term such that the end result is not significantly changed. These terms should be construed as including a deviation of at least ±5% to 10% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle derailleur comprising:
    a fixed member configured to be coupled to a bicycle frame;
    a movable member having a chain guide portion with a chain receiving slot configured to shift a chain of the bicycle in a transverse direction;
    a linkage assembly coupled between the fixed member and the chain guide portion to move the chain guide portion between a retracted position and an extended position; and
    a cable attachment assembly coupled to the linkage assembly, the cable auachment assembly including
        a cable fixing bolt having a head portion with a tool engaging surface and a shaft with a threaded portion that is received in a threaded hole of the linkage assembly,
        a cable fixing washer including an outer peripheral surface and an inner peripheral surface defining a bolt receiving opening in which the shaft of the cable fixing bolt is located; and
        a resilient member being retained on the shaft between the threaded portion and the head portion, the resilient member being arranged to retain the cable fixing washer on the shaft of the cable fixing bolt.

2. The bicycle derailleur according to claim 1, wherein the resilient member is a flexible O-ring.

3. The bicycle derailleur according to claim 1, wherein
at least one of the cable fixing washer and the shaft includes a groove with the resilient member disposed therein.

4. The bicycle derailleur according to claim 3, wherein
the groove with the resilient member disposed therein is formed in the shaft of the cable fixing bolt, and
the resilient member contacts the inner peripheral surface of the cable fixing washer.

5. The bicycle derailleur according to claim 4, wherein
the shaft includes a non-threaded section with the groove disposed between the threaded portion and the non-threaded section.

6. The bicycle derailleur according to claim 3, wherein
the inner peripheral surface of the cable fixing washer has a first annular section with a first predetermined width and a second annular section with a second predetermined width that is smaller than the first predetermined width of the first annular section to form an axially facing abutment surface.

7. The bicycle derailleur according to claim 6, wherein
the resilient member disposed within the second annular section of the inner peripheral surface of the cable fixing washer.

8. The bicycle derailleur according to claim 1, wherein
the outer peripheral surface of the cable fixing washer has a tapered section extending from adjacent an axially facing end surface in a radially outward direction.

9. The bicycle derailleur according to claim 1, wherein
the inner peripheral surface of the cable fixing washer has a first annular section with a first predetermined width and a second annular section with a second predetermined width that is smaller than the first predetermined width of the first annular section to form an axially facing abutment surface.

10. The bicycle derailleur according to claim 9, wherein
the resilient member disposed within the second annular section of the inner peripheral surface of the cable fixing washer.

11. The bicycle derailleur according to claim 10, wherein
the shaft includes a non-threaded section with a groove formed between the threaded portion and the non-threaded section, and
the resilient member is disposed within the groove such that the resilient member contacts the second annular section of the inner peripheral surface of the cable fixing washer.

12. A bicycle derailleur comprising:
fixed member configured to be coupled to a bicycle frame;

movable member having a chain guide portion with a chain receiving slot configured to shift a chain of the bicycle in a transverse direction;

linkage assembly coupled between the fixed member and the chain guide portion to move the chain guide portion between a retracted position and an extended position; and cable attachment assembly coupled to the linkage assembly, the fixed member including a derailleur fixing bolt having a head portion with a tool engaging surface and a shaft with a threaded portion that is received in a threaded hole formed the fixed member, a derailleur fixing washer including an outer peripheral surface and an inner peripheral surface defining a bolt receiving opening in which the shaft of the derailleur fixing bolt is located; and a resilient member being retained on the shaft between the threaded portion and the head portion, the resilient member being arranged to retain the derailleur fixing washer on the shaft of the derailleur fixing bolt.

13. The bicycle derailleur according to claim 12, wherein the resilient member is a flexible O-ring.

14. The bicycle derailleur according to claim 12, wherein the derailleur fixing washer has a concave end surface facing in an axial direction relative to the bolt receiving opening.

15. The bicycle derailleur according to claim 14, further comprising a secondary washer disposed between the derailleur fixing washer and the head portion of the derailleur fixing bolt.

16. The bicycle derailleur according to claim 12, wherein at least one of the derailleur fixing washer and the shaft includes a groove with the resilient member disposed therein.

17. The bicycle derailleur according to claim 16, wherein the groove with the resilient member disposed therein is formed in the shaft of the derailleur fixing bolt, and the resilient member contacts the inner peripheral surface of the derailleur fixing washer.

18. The bicycle derailleur according to claim 17, wherein the shaft includes a non-threaded section with the groove disposed between the threaded portion and the non-threaded section.

19. The bicycle derailleur according to claim 16, wherein the inner peripheral surface of the washer has a first annular section with a first predetermined width and a second annular section with a second predetermined width that is smaller than the first predetermined width of the first annular section to form an axially facing abutment surface.

20. The bicycle derailleur according to claim 19, wherein the resilient member disposed within the second annular section of the inner peripheral surface of the derailleur fixing washer.

21. The bicycle derailleur according to claim 12, wherein the inner peripheral surface of the derailleur fixing washer has a first annular section with a first predetermined width and a second annular section with a second predetermined width that is smaller than the first predetermined width of the first annular section to form an axially facing abutment surface.

22. The bicycle derailleur according to claim 21, wherein the resilient member disposed within the second annular section of the inner peripheral surface of the derailleur fixing washer.

23. The bicycle derailleur according to claim 22, wherein the shaft includes a non-threaded section with a groove formed between the threaded portion and the non-threaded section, and the resilient member is disposed within the groove such that the resilient member contacts the second annular section of the inner peripheral surface of the derailleur fixing washer.

24. The bicycle derailleur according to claim 12, wherein the cable attachment assembly includes a cable fixing bolt having a bead portion with a tool engaging surface and a shaft with a threaded portion that is received in a threaded hole of the linkage assembly, a cable fixing washer including an outer peripheral surface and an inner peripheral surface defining a bolt receiving opening in which the shaft of the cable fixing bolt is located; and a resilient washer retaining member being retained on the shaft of the cable fixing bolt between the threaded portion of the cable fixing bolt and the head portion of the cable fixing bolt, the resilient washer retaining member being arranged to retain the cable fixing washer on the shaft of the cable fixing bolt.

* * * * *